United States Patent
Burris et al.

(10) Patent No.: US 10,920,908 B2
(45) Date of Patent: Feb. 16, 2021

(54) VALVE STEM FOR CHOKE VALVE

(71) Applicant: DDS INVESTMENTS, LLC, Junction City, KS (US)

(72) Inventors: Mark Burris, Manhattan, KS (US); Kenny Burris, Manhattan, KS (US); Bryce W. Burris, Manhattan, KS (US)

(73) Assignee: DDS Investments, LLC, Junction City, KS (US)

( * ) Notice: Subject to any disclaimer, the term of this patent is extended or adjusted under 35 U.S.C. 154(b) by 275 days.

(21) Appl. No.: 15/876,938

(22) Filed: Jan. 22, 2018

(65) Prior Publication Data
US 2019/0226602 A1 Jul. 25, 2019

(51) Int. Cl.
| F16K 1/48 | (2006.01) |
| E21B 34/02 | (2006.01) |
| F16K 41/00 | (2006.01) |
| F16K 25/00 | (2006.01) |
| F16K 1/06 | (2006.01) |
| E21B 33/12 | (2006.01) |
| F16K 3/24 | (2006.01) |
| F16K 1/04 | (2006.01) |

(52) U.S. Cl.
CPC ............ F16K 41/006 (2013.01); E21B 33/12 (2013.01); F16K 1/06 (2013.01); F16K 3/243 (2013.01); F16K 25/005 (2013.01); *F16K 1/04* (2013.01)

(58) Field of Classification Search
CPC .......... F16K 41/006; F16K 3/243; F16K 1/06; F16K 25/005; F16K 1/04; F16K 1/487; F16K 1/485; F16K 1/482; F16K 1/48; E21B 33/12; E21B 34/02
See application file for complete search history.

(56) References Cited

U.S. PATENT DOCUMENTS

| 852,644 | A | | 5/1907 | Bacon | |
| 1,392,411 | A | * | 10/1921 | Gavin | F16K 1/487 |
| | | | | | 251/86 |
| 1,499,433 | A | | 7/1924 | Williston | |
| 1,831,713 | A | | 11/1931 | Knowlton | |
| 1,911,905 | A | | 5/1933 | Knowlton et al. | |
| 3,262,673 | A | | 7/1966 | Seeley | |
| 3,693,732 | A | | 9/1972 | Sabi | |
| 4,047,695 | A | | 9/1977 | Cleveland et al. | |
| 4,705,062 | A | * | 11/1987 | Baker | F16K 1/38 |
| | | | | | 137/315.02 |
| 4,721,284 | A | | 1/1988 | Bankard | |

(Continued)

FOREIGN PATENT DOCUMENTS

GB 156922 A * 1/1921 ............... F16K 1/48

OTHER PUBLICATIONS

Brochure, H2 Needle-and-seat chokes, Cameron, A Schlumerger Company, 2016.

(Continued)

Primary Examiner — Marina A Tietjen
(74) Attorney, Agent, or Firm — McAfee & Taft

(57) ABSTRACT

A valve stem includes a valve stem body connected to a valve stem head. The valve stem is for use with a choke valve. The valve stem body has first and second ends with an expandable valve stem tip extending from the second end of the valve stem body. The valve stem tip expands radially outwardly in an opening in the valve stem head to secure the valve stem head to the valve stem body.

20 Claims, 5 Drawing Sheets

(56) References Cited

U.S. PATENT DOCUMENTS

| | | | |
|---|---|---|---|
| 4,763,874 A | 8/1988 | Ogawa | |
| 5,201,335 A * | 4/1993 | Osgood | F16B 13/08 137/15.24 |
| 5,775,356 A | 7/1998 | Ko | |
| 7,387,292 B1 * | 6/2008 | Fleming | F16B 39/023 251/357 |
| 8,087,641 B2 | 1/2012 | Masamura | |
| 8,261,841 B2 | 9/2012 | Bailey et al. | |
| 8,807,165 B2 | 8/2014 | Frank | |
| 9,022,070 B2 | 5/2015 | Anderson | |
| 9,316,321 B2 | 4/2016 | Mccarty | |

OTHER PUBLICATIONS

Technical Manual, MSI Manually Adjustable Choke, MSI—a Division of Dixie Iron Works, Ltd., Alice, Texas, undated but admitted to be prior art.

* cited by examiner

VALVE STEM FOR CHOKE VALVE

BACKGROUND

Adjustable choke valves are utilized in a number of industrial and oilfield applications to control and regulate flow. Adjustable chokes are often used as part of a manifold installed downstream of a well head. Choke valves typically are comprised of a number of different sub assemblies, one of which is the valve stem. A valve stem will typically include a valve stem body with a valve stem head connected thereto. The head is in many cases a tungsten and carbide tip that is brazed to the valve stem body. Oftentimes the valve stem head will break or become loose. If this occurs in operation the choke valve will not operate properly, and a new choke valve stem must be substituted.

SUMMARY

The current disclosure is directed to a valve stem that includes a valve stem body connected to a valve stem head. The valve stem head is secured to the valve stem body such that inadvertent loosening, disconnection or removal of the valve stem head will not occur. The valve stem is for use with a choke valve which may be utilized in industrial and oilfield applications for the purpose of regulating flow.

The valve stem body has first and second ends. A valve stem tip which is an expandable valve stem tip extends from the second end of the valve stem body. The valve stem tip may be integrally formed with the valve stem body or may be connected thereto by any means known in the art. The expandable tip defines an opening therein. An insert will engage the expandable tip and will be pressed into the opening therein to expand the tip radially outwardly. The valve stem tip is inserted into an opening in the valve stem head and will expand radially outwardly in the opening of the valve stem head to secure the valve stem body to the valve stem head.

The insert may comprise for example a spherical insert and the expandable tip may comprise a segmented tip with a plurality of segments. The opening in the valve stem head is a stepped opening. The stepped opening comprises an entry opening defining an entry diameter and an internal cavity defining a cavity diameter. The cavity diameter is greater than the entry diameter. The expandable tip is inserted through the entry opening and will expand radially outwardly in the internal cavity to an outer dimension greater than the entry opening diameter. As a result the expandable tip cannot be pulled back through the entry opening.

The valve stem head presses the insert into the opening in the expandable tip to radially expand the tip in the internal cavity. The opening in the valve stem head has an end face which will press the insert into the opening in the expandable tip. The valve stem is a part of a choke valve which also includes a valve body defining a flow inlet and flow outlet and a flow passage communicating the flow inlet with the flow outlet. A valve seat is defined in the valve body between the flow inlet and the flow outlet. The valve stem is disposed in the valve body and is operable with the valve seat to regulate flow through the valve passage.

In an embodiment the expandable tip moves from a first or relaxed position to a second or expanded position upon insertion of the expandable tip into the valve stem head. The valve stem head is secured to the valve stem body when the tip is in the expanded position. The insert moves the expandable valve stem tip to the expanded position when it is pressed therein by the end face of the opening in the valve stem head. The expandable tip is a segmented tip with a plurality of segments having slots therebetween. In the radially expanded position the segments of the valve stem tip are bent radially outwardly to an outer dimension or outer diameter that is greater than the diameter of the entry opening. As a result, the valve stem head will not inadvertently or accidently become loosened or removed from the valve stem body.

BRIEF DESCRIPTION OF THE DRAWINGS

FIG. 6 is an enlarged view of the connection between the valve stem body and the valve stem head.

DESCRIPTION OF EMBODIMENT

Figure 1:
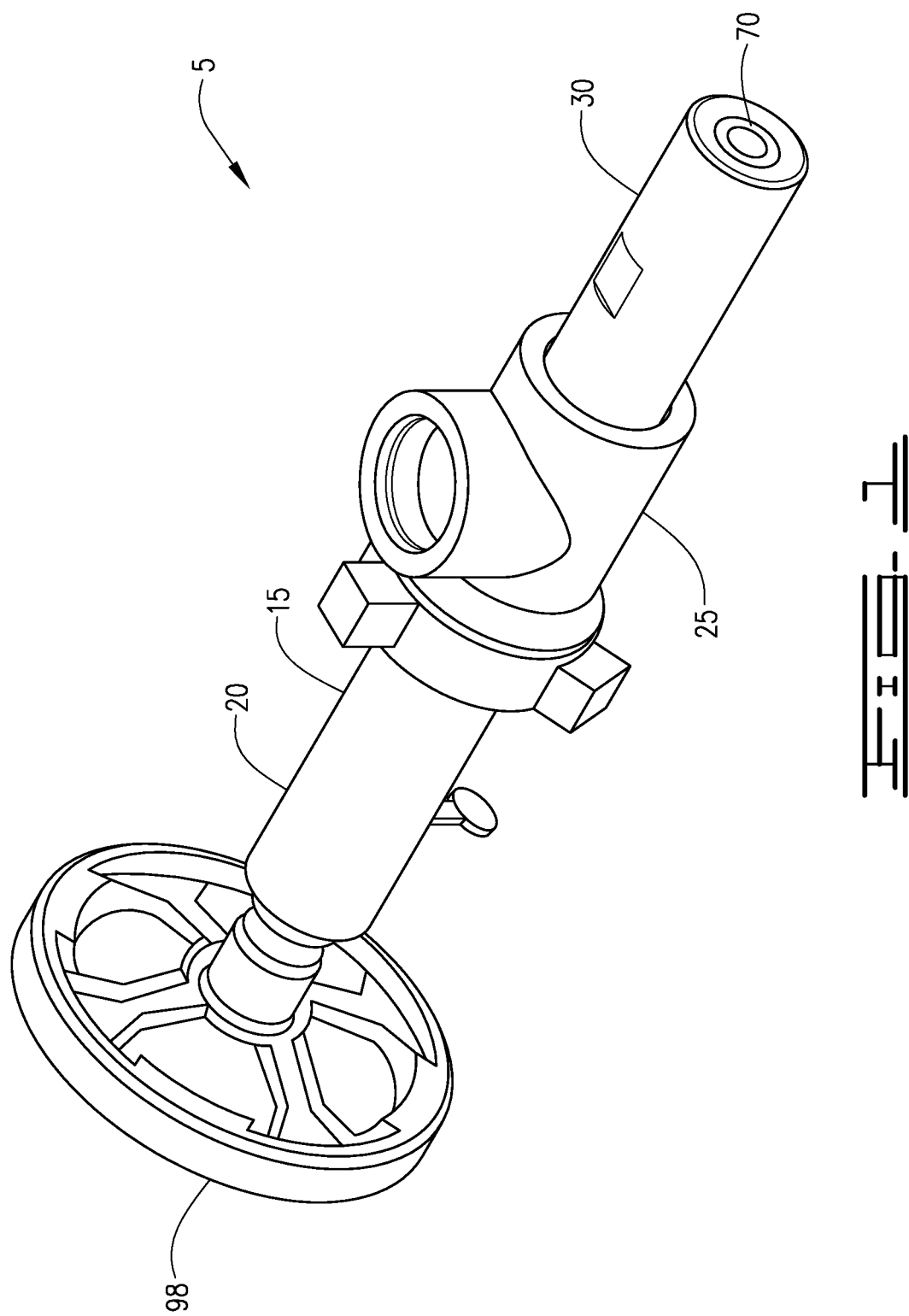
FIG. 1 is a perspective view of the choke valve of the current disclosure.
Figure 2:
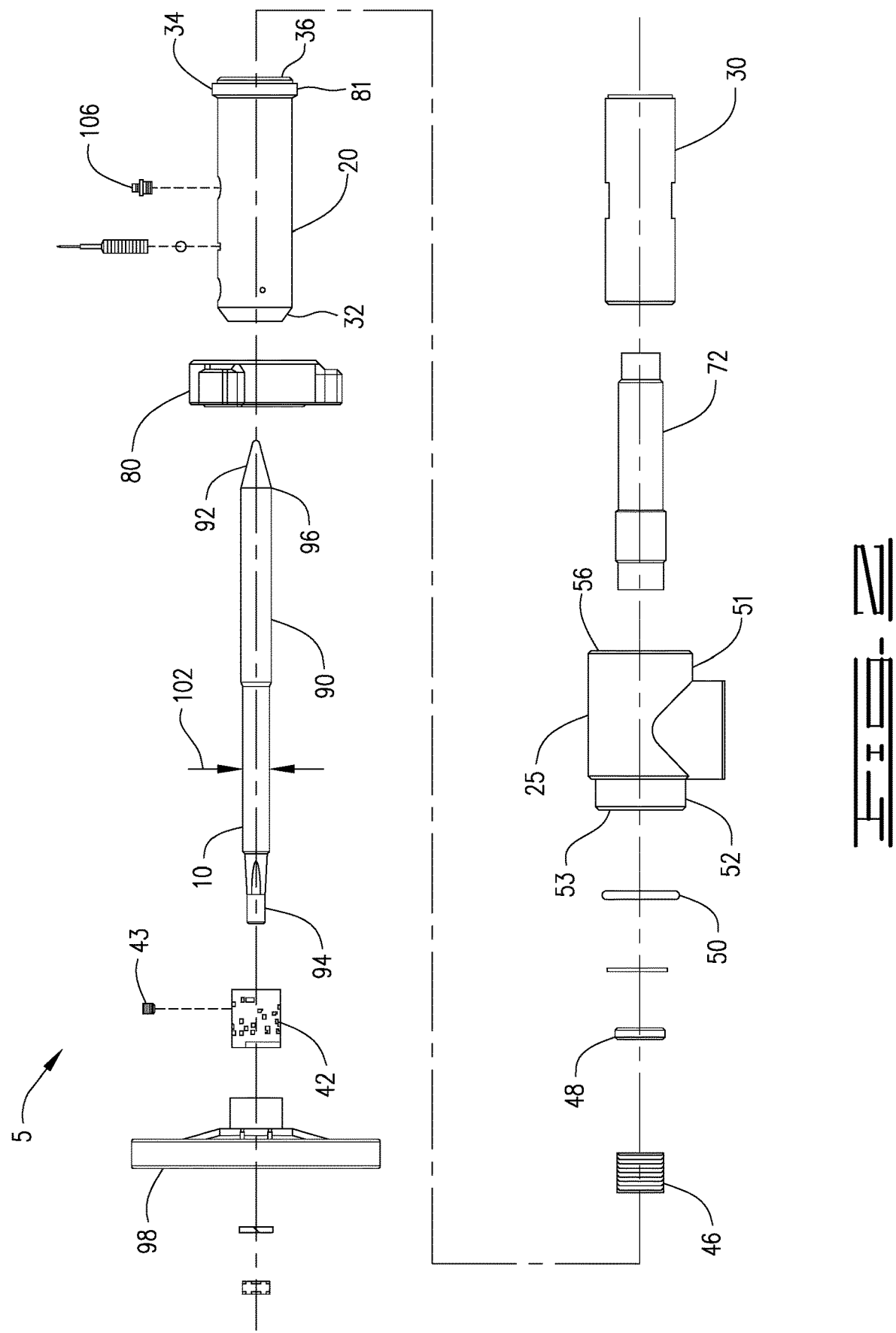
FIG. 2 is an exploded view of the choke valve.
Figure 3:
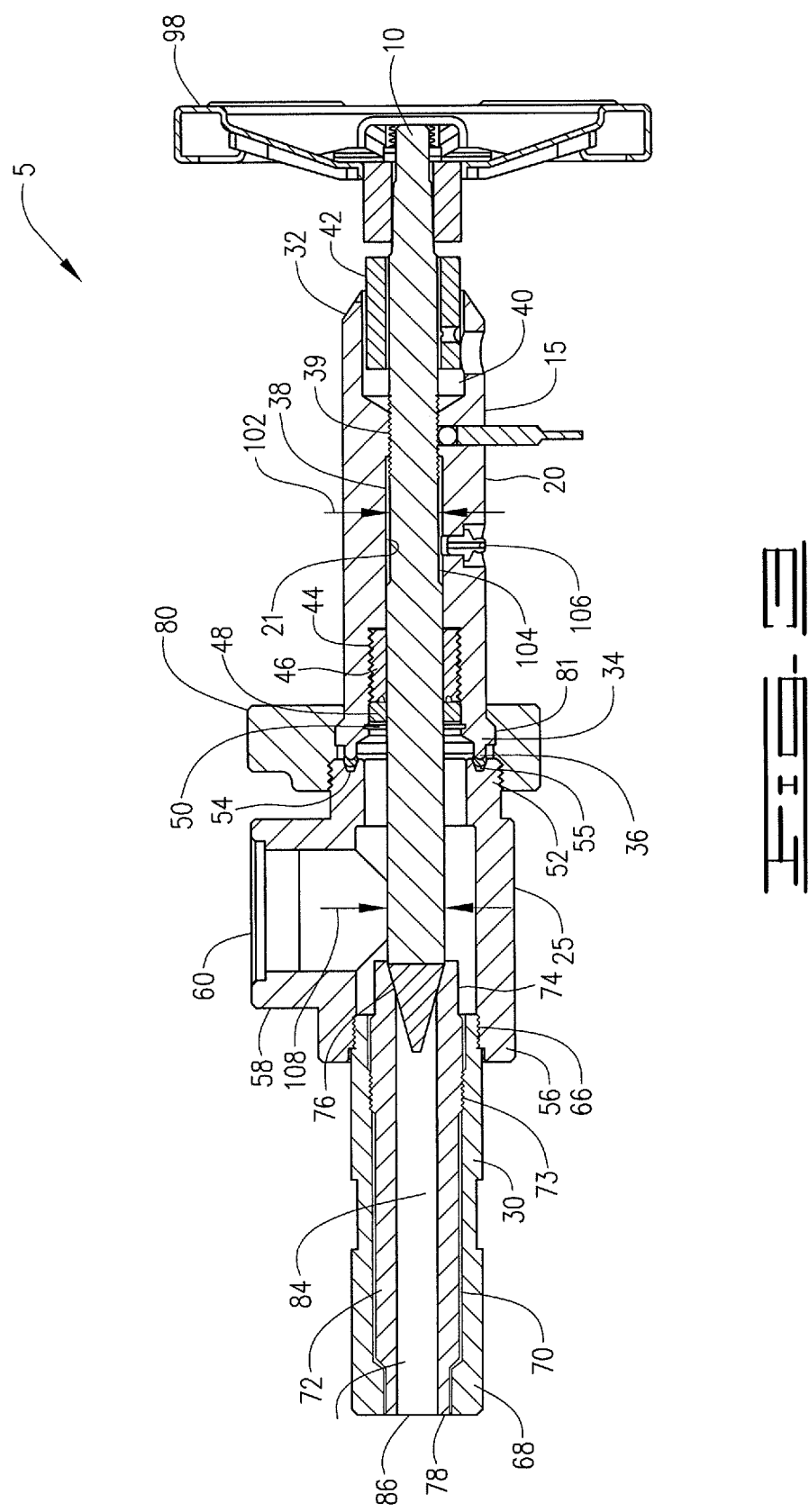
FIG. 3 is cross section of the choke valve with the choke valve stem of the current disclosure.
Figure 4:
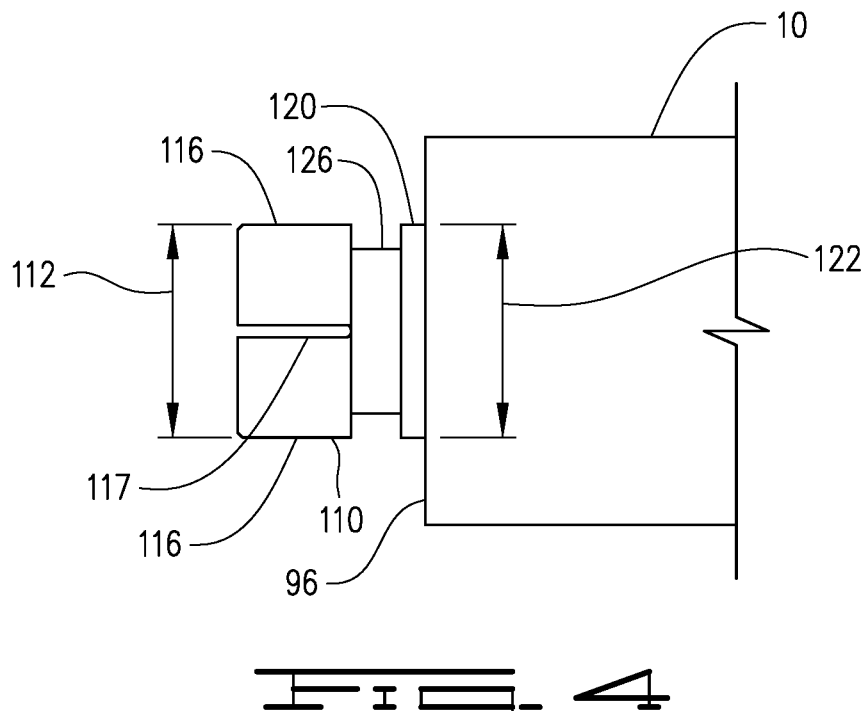
FIG. 4 is a side view of a portion of the valve stem body of the current disclosure.
Figure 5:
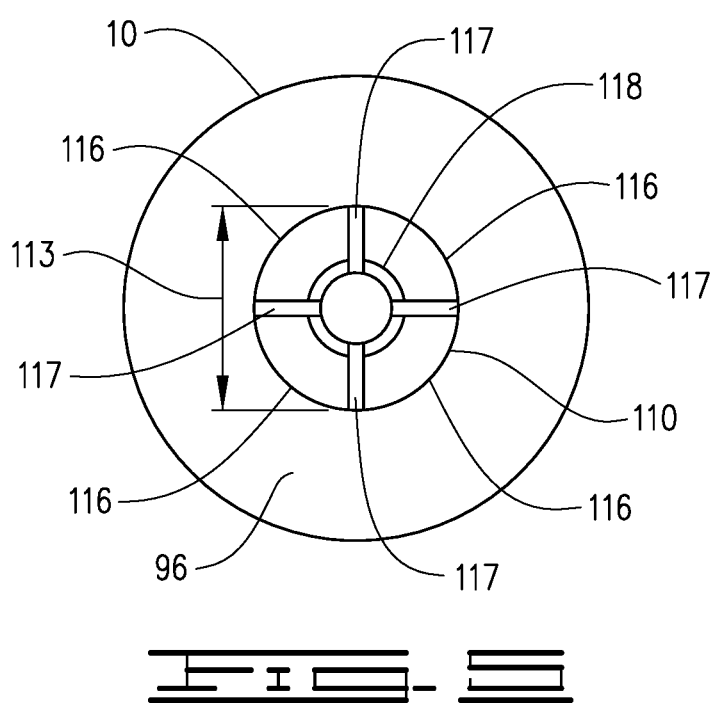
FIG. 5 is an end view of the valve stem body.
Figure 5:
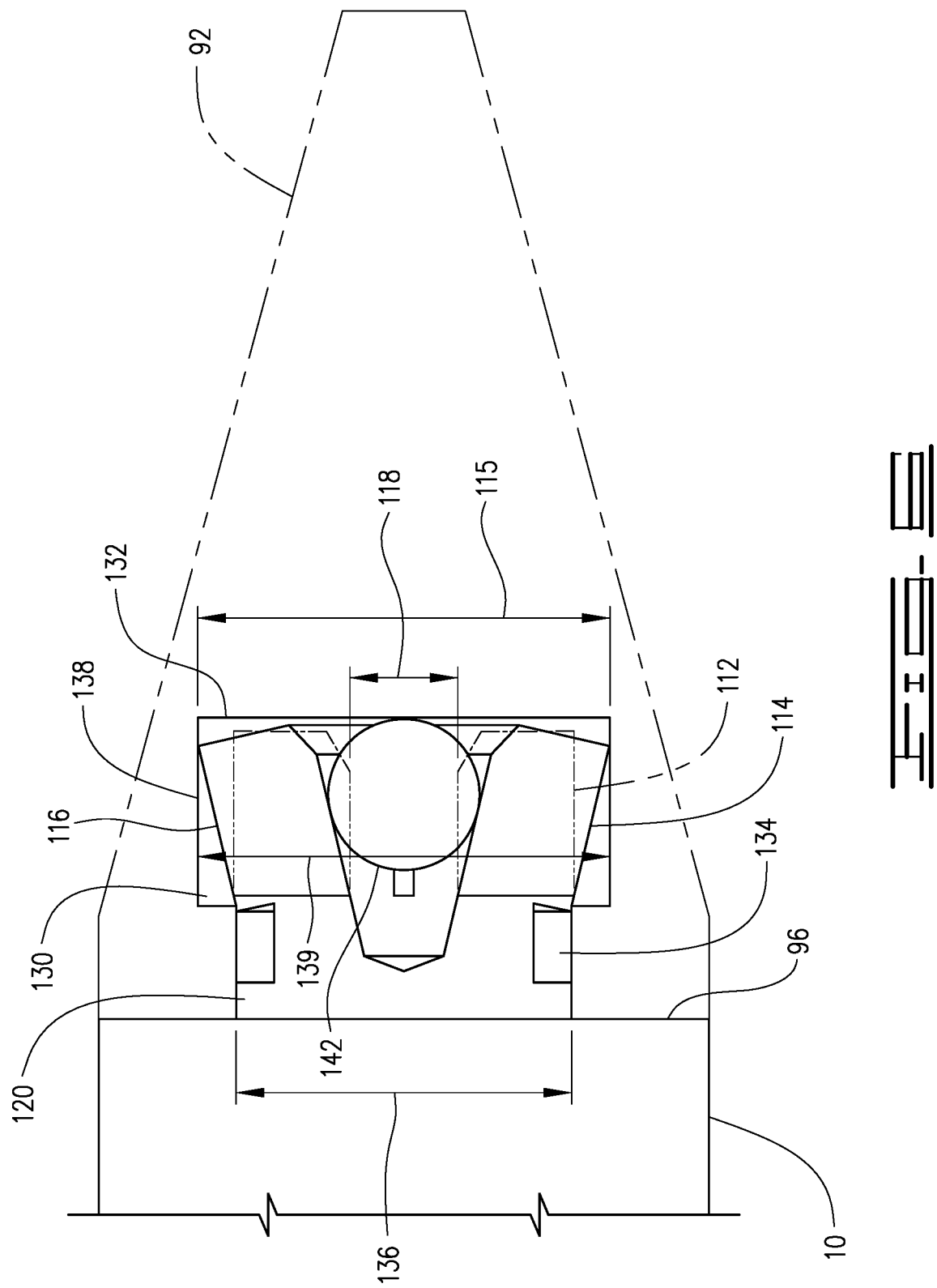

A choke valve 5 of the type used in a flow line to regulate flow therethrough comprises a valve stem 10 inserted into a valve body 15. As is explained in detail herein, valve stem 10 will rotate in valve body 15 and will move up and down in relation to a valve seat to regulate flow therethrough. Valve body 15 comprises a bonnet 20, a tee union 25 and a valve seat body 30.

Bonnet 20 has upper, or first end 32 and lower, or second end 34 with a ridge 36 extending from lower end 34. Bonnet 20 defines a central passage 38 through which valve stem 10 extends. Valve stem 10 is threadedly connected to bonnet 20 at a threaded neck portion 39 in central passage 38.

Central passage 38 includes an upper cavity 40 at the upper end 32 thereof for receiving a choke indicator 42. Choke indicator 42 is held in place by an indicator set screw 43 and as is known in the art will have indications thereon to allow choke valve 5 to be set for a desired regulated flow. A bottom cavity 44 is defined by bonnet 20 at the lower end 34 thereof. A sealing 46 element which may be for example a packing seal 46 is received in lower cavity 44 and valve stem 10 is sealingly inserted therethrough. A bearing 48 which may be a brass bearing and a snap ring 50 hold packing seal 46 in place in lower cavity 44.

Tee union 25 has run 51 with first, or upper end 52 with a groove 54 defined in end face 53 of first end 52. An O-ring 55 may be received in groove 54. Run 51 on tee union 25 has a second, or lower end 56 with an internal thread thereon. Tee portion 58 extends from run 51 and defines an inlet 60.

Seat body 30 has upper, or first end 66 that is threadedly connected to tee union 25. Seat body 30 has a lower, or second end 68 and defines an opening 70 therethrough from upper end 66 to lower end 68. A seat sleeve 72 is threaded to seat body 30 at a threaded connection 73. Seat sleeve 72 has upper end 74 that defines a seat 76 thereon and a lower end 78. A hammer union 80 engages an outwardly extending shoulder 81 on bonnet 20 and is threadedly connected to the upper end 52 of tee union 25. Hammer union 80 is threaded onto tee union 25 and will urge ridge 36 into engagement with the O-ring seal 55 positioned in groove 54. The assembled valve body 15 defines a flow passage 84 between flow inlet 60 and a flow outlet 86. Flow seat 76 is interposed between flow inlet 60 and flow outlet 84 in flow path 86. As a result flow through choke valve 5 can be regulated by changing the distance between the valve stem 10 and seat 76. The flow may be regulated to any desired position between open and closed to achieve the desired flow and valve stem 10 may be intermittently shifted up or down to regulate flow therethrough.

Valve stem 10 comprises a valve stem body 90 with a valve stem head 92 secured thereto. Valve stem head 92 is a conically shaped valve stem head and as explained herein is operable with the valve seat 76 to regulate flow. Valve stem 10 is movable in the valve body 15 to vary the space between the valve stem head 92 and the seat 76 to thereby regulate flow through flow path 84.

Valve stem body 90 has first, or upper end 94 that is threadedly connected to an adjustment wheel 98. The adjustment wheel 98 may be rotated which will in turn rotate valve stem body 90 in threaded connection 39 to adjust the position of the valve stem 10 relative to valve seat 76 to regulate flow through flow path 86. The choke indicator 42 as known in the art will indicate the position of the valve stem 10 relative to the seat 76. Valve stem body 90 may comprise a stepped shaft with a first diameter 102. A grease cavity 104 may be defined by and between first diameter 102 and an inner surface 21 of bonnet 20. A second diameter 108, which is greater than first diameter 102 extends through packing seal 46 and bearing 48 and into tee union 25.

An expandable tip 110 extends from second end 96 of valve stem body 90. Expandable tip 110 has a first or relaxed position 112 and a second or expanded position 114. In the expanded position 114 expandable tip 110 expands radially outwardly to an outer diameter or outer dimension 115 greater than the relaxed diameter 113 in first or relaxed position 112. Expandable tip 110 is a segmented tip and thus comprises a plurality of segments 116 with slots 117 therebetween. In expanded position 114 segments 116 are bent radially outwardly to outer dimension 115. A central opening 118 is defined by expandable tip 110. A shoulder 120 with an outer diameter 122 which may be for example the same as diameter 113 extends from the second end 96 of valve stem body 90. A reduced diameter neck 126 extends from shoulder 120 and is connected to tip segments 116.

Valve stem head 92 defines an opening 130 therein. Opening 130 has an end face 132 and may comprise an entry opening 134 with an entry diameter 136 connected to an internal cavity 138. Internal cavity 138 extends from entry opening 134 and has a second diameter 139 that is larger than diameter 136. An insert 142 which may be for example a ball or spherically shaped insert 142 is pressed into central opening 118 to move expandable tip 110 from the first position 112 to the second position 114 in which the tip is expanded radially outwardly. Insert 142 is pressed into opening 118 with end face 132 of opening 130. Expandable tip 110 is inserted through entry opening 112 in its first or relaxed position 112. Valve stem body 90 will continue to be pressed into opening 130 through entry opening 134 and into internal cavity 138. As valve stem body 90 pushes expandable tip 110 insert 142 will engage end face 132. Expandable tip 90 will continue to be pushed into opening 130 until insert 142 urges segments 116 radially outwardly to outer dimension 115 that is larger than the outer diameter 113 such that the valve stem body 90 is secured to valve stem head 92. In this way the valve stem body 90 is secured to the valve stem head 92 in such a way that inadvertent loosening or disassembly will not occur. In the event valve stem head 92 begins to move in a direction away from valve body 90, head 92 will then engage the outer surface of segments 116 which will not be allowed to be moved radially inwardly as a result of interacting with segments 116.

Therefore, the present disclosure is well adapted to attain the ends and advantages mentioned, as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative examples disclosed above may be altered or modified, and all such variations are considered within the scope and spirit of the present disclosure. While apparatus and methods may be described in terms of "comprising," "containing," "having," or "including" various components or steps, the apparatus and methods can also, in some examples, "consist essentially of" or "consist of" the various components and steps. Also, the terms in the claims have their plain, ordinary meaning unless otherwise explicitly and clearly defined by the specification.

The invention claimed is:

1. A valve stem comprising:
   a valve stem body having an expandable tip;
   a detached spherical insert; and
   a valve stem head defining an opening configured to receive the detached spherical insert and the expandable tip, wherein upon insertion of the detached spherical insert and the expandable tip into the opening in the valve stem head the detached spherical insert causes the expandable tip to expand radially outwardly to attach the valve stem body to the valve stem head.

2. The valve stem of claim 1, further comprising:
   the valve stem head having a maximum outer diameter; and
   the valve stem body having a maximum outer diameter, wherein the maximum outer diameter of the valve stem body is substantially the same size as the maximum outer diameter of the valve stem head.

3. The valve stem of claim 1, the expandable tip comprising a segmented tip having a plurality of tip segments.

4. The valve stem of claim 3, wherein the opening in the valve stem head is a stepped opening comprising:
   an entry opening defining an entry diameter; and
   an internal cavity defining a cavity diameter greater than the entry diameter, wherein the expandable tip expands radially outwardly in the internal cavity to an outer dimension greater than the entry opening diameter.

5. The valve stem of claim 4, wherein the valve stem head presses the detached spherical insert into the opening in the expandable tip to radially expand the expandable tip in the internal cavity.

6. The valve stem of claim 5, wherein the valve stem head is conically shaped.

7. A choke valve comprising:
   a valve body defining a flow inlet and a flow outlet and a flow passage communicating the flow inlet and flow outlet;
   a valve seat in the valve body, the valve seat positioned between the flow inlet and the flow outlet;
   a valve stem disposed in the valve body and operable with the valve seat to regulate flow through the flow passage, the valve stem comprising:
      a valve stem head defining an opening in an end thereof;
      a valve stem body;

a detached spherical insert being loosely positioned in the opening of the valve stem head; and a segmented expandable tip defining a plurality of tip segments and movable from a relaxed position to an expanded position extending from the valve stem body, wherein the detached spherical insert causes the expandable tip to radially expand to an expanded position in the opening in the valve stem head when the expandable tip is pressed into the opening of the valve stem head, and wherein the valve stem head is secured to the valve stem body when the expandable tip is in the expanded position.

8. The choke valve of claim 7 further comprising:
the valve stem head having a maximum outer diameter; and
the valve stem body having a maximum outer diameter, wherein the maximum outer diameter of the valve stem body is substantially the same size as the maximum outer diameter of the valve stem head.

9. The choke valve of claim 7, wherein the opening in the valve stem head comprises an entry opening and an internal cavity, and wherein the segmented expandable tip is inserted into the internal cavity through the entry opening and expands radially outwardly in the internal cavity to the expanded position to secure the valve stem head to the valve stem body.

10. The choke valve of claim 9, wherein the internal cavity diameter of the valve stem head is smaller than the maximum outer diameter of the valve stem body and the valve stem is movable in the valve body toward and away from the valve seat to regulate flow through the flow passage.

11. A choke valve stem for use in a choke valve designed to regulate flow comprising:
a valve stem head defining an opening therein, the valve stem head having a maximum outer diameter;
a valve stem body having first and second ends, the valve stem body having a maximum outer diameter, wherein the maximum outer diameter of the valve stem body is substantially the same size as the maximum diameter of the valve stem head;
an expandable tip movable from a relaxed position to an expanded position, the expandable tip extending from the second end of the valve stem body and received in the opening in the valve stem head, wherein the expandable tip moves to the expanded position and secures the valve stem body to the valve stem head when it is received in the opening in the valve stem head; and
a detached insert inserted into a central opening of the expandable tip to move the expandable tip from the relaxed to the expanded position.

12. The choke valve stem of claim 11, a wherein an end face of the opening in the valve stem head presses the detached insert into the central opening of the expandable tip.

13. The choke valve stem of claim 12, wherein the detached insert comprises a spherical insert.

14. The choke valve stem of claim 13, wherein the opening in the valve stem head has a first diameter and a second diameter greater than the first diameter, wherein the spherical insert is pressed into the central opening of the expandable tip after the expandable tip passes through the first diameter.

15. The choke valve stem of claim 14, wherein the opening in the valve stem head has an end surface, and wherein the end surface presses the detached insert into the central opening of the expandable tip.

16. The choke valve stem of claim 15, wherein the expandable tip is secured to the valve stem body when the detached insert urges the expandable tip to the expanded position.

17. A valve stem comprising:
a valve stem body having an expandable tip;
a valve stem head defining an opening therein;
a detached insert positioned in the opening, the expandable tip being engageable with the detached insert such that upon insertion of the tip into the opening, the expandable tip expands radially outwardly to connect the valve stem body to the valve stem head.

18. The valve stem of claim 17, the insert comprising a non-threaded insert.

19. The valve stem of claim 17, the opening in the valve stem head having an entry opening defining a first diameter, the expandable tip having a diameter greater than the entry opening in an expanded position thereof.

20. The valve stem of claim 17, the valve stem head comprising a conically shaped valve stem head.

* * * * *